March 13, 1928.  
J. IRONSIDE  
1,662,068  
FITTING FOR SHEET METAL  
Filed March 2, 1925
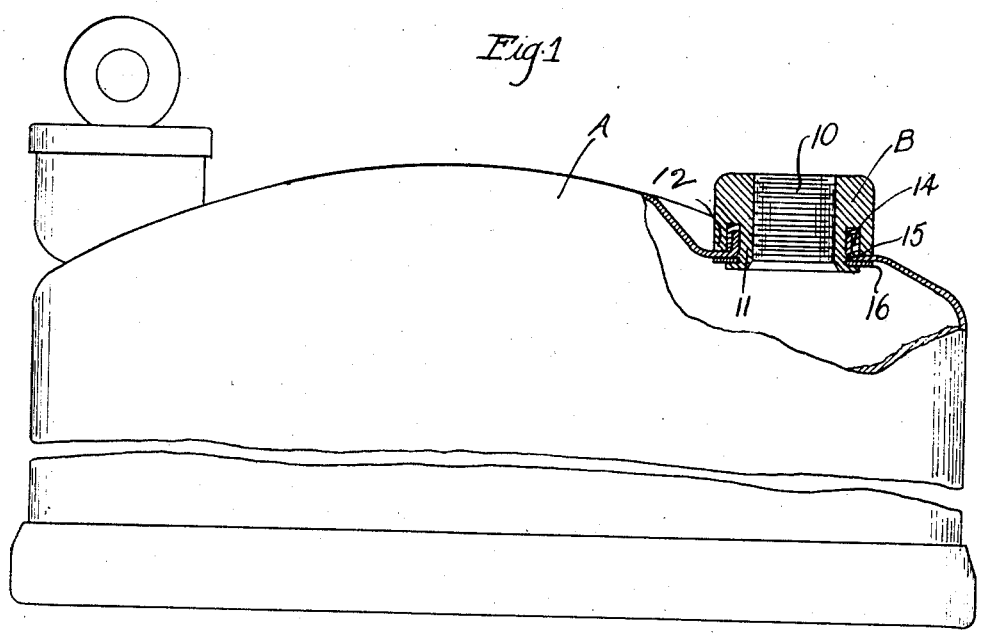
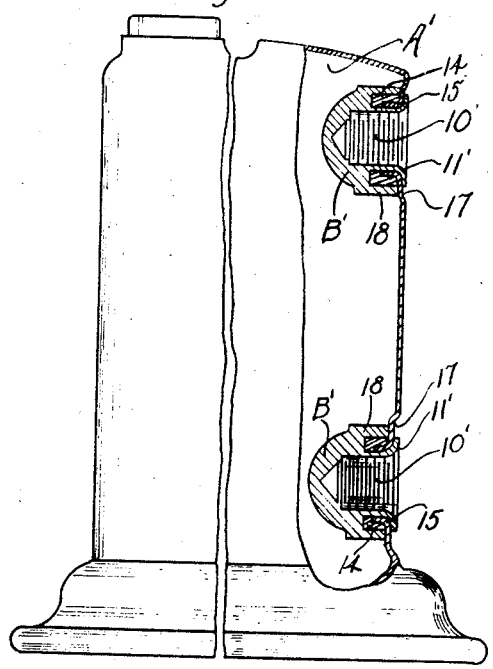
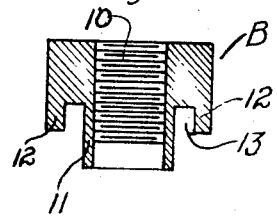
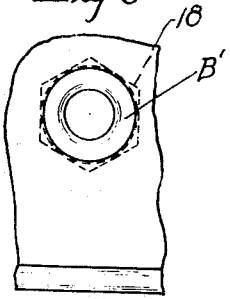
Inventor  
James Ironside  
By Whittemore Hulbert Whittemore & Belknap  
Attorneys Patented Mar. 13, 1928.

1,662,068

UNITED STATES PATENT OFFICE.

JAMES IRONSIDE, OF DETROIT, MICHIGAN, ASSIGNOR TO CLAYTON AND LAMBERT MANUFACTURING COMPANY, OF DETROIT, MICHIGAN, A CORPORATION OF MICHIGAN.

FITTING FOR SHEET METAL.

Application filed March 2, 1925. Serial No. 12,753.

The invention relates to fittings and refers more particularly to fittings for fire pots, torch tanks, and the like for plumbers' use. The fitting is not limited to plumbers' fire pots, however, and may be used wherever a fitting of the character described may be found useful.

One of the objects of the invention is to provide an improved method of attaching fittings to sheet metal, such as fire pots. A further feature of the invention resides in the use of a solder composition applied within the fitting whereby no solder is used on the outside of the fitting. A further feature resides in providing a fitting adapted to house a soldering composition whereby upon application of heat the soldering compound will flow to form a tight joint but will not run out of the fitting.

With these and other objects in view, the invention resides in the novel features of construction and combinations and arrangements of parts as more fully hereinafter described and claimed.

Referring to the drawings:

Figure 1 is a fire pot tank with a portion thereof broken away showing a fitting embodying my invention applied thereto.

Figure 2 is a similar view of a torch tank.

Figure 3 is a fragmentary view in elevation of one of the figures illustrated in Figure 2, and Figure 4 is a section of a fitting.

In the drawings reference character A indicates a fire pot tank or other article of sheet metal in which a fitting is to be secured. B represents a fitting or plug and may have a threaded opening 10 to insert a pipe, conduit, or other fixture. The fitting B is preferably formed with a cylindrical skirt portion 11 and an annular flange 12 forming an annular recess 13 adapted to receive a soldering composition preferably formed in an annular ring 14.

In applying the fitting an opening is formed in the sheet metal and the peripheral edge thereof is preferably bent at right angles as indicated at 15. The fitting B is then applied, the skirt 11 entering the opening, the soldering composition 14 positioned between the edge 15 and the flange 12. If preferred a washer 16 may then be positioned against the sheet metal and the skirt portion 11 bent or spun over at right angles tightly clamping the sheet metal between the flange 12 and the spun over portion of the skirt 11. The fitting is then heated causing the solder to melt and form an airtight rigid connection between the fitting and sheet metal by reason of the annular recess 13 and the spun over portion of the skirt 11. It will be noted that a housing will be formed for the solder preventing its running at the B fitting. It will be further noted that the solder is applied entirely within the fitting and forms a soldered joint entirely within the fitting.

In Figures 2 and 3 I have shown fitting B' of the same general character as the fitting B, applied to the torch tank A'. The fittings B' are internally bored at 10' to receive the supporting arms of a handle or other fixture (not shown). In these views the skirt portion 11' is bent or spun over directly into contact with the sheet metal, no intermediate washer being employed. The sheet metal may be slightly depressed as shown at 17 in order to bring the spun over skirt portion in the plane of the sheet metal. For holding the bushing while the skirt portion is being spun the fitting may be provided with a polygonal face 18 engageable by any suitable holding means.

With reference to Figure 2 it will be noted that the fittings B' form a closure for the torch tank whereby the handle (not shown) may be removed for repair or otherwise, while the tank is under pressure without permitting escape of the contents of the tank.

While it is believed that from the foregoing description, the nature and advantage of my invention will be readily understood, I desire to have it understood that I do not limit myself to what is herein shown and described and that such changes may be resorted to when desired as fall within the scope of the claims.

What I claim as my invention is:—

1. In a tank having a laterally flanged aperture, a handle attaching means comprising a plug for engaging a handle, said plug having a skirt and flange portion forming an annular groove concentric with the axis of the plug, a charge of solder positioned in the end of said groove and said groove being adapted to receive said lateral flange, said skirt portion of the plug being adapted to be spun over against the surface of said tank adjacent said aperture.

2. In a tank having a laterally flanged aperture, a handle attaching means comprising a plug for engaging a handle, said plug having a skirt and flange portion forming an annular groove concentric with the axis of the plug, a charge of solder positioned in the end of said groove and said groove being adapted to receive said lateral flange, said skirt portion of the plug being turned over to clamp the wall of the tank directly between the flange and skirt of the plug.

3. In a tank having a laterally flanged aperture, an internally threaded plug member, said plug having an annular skirt and flange portion forming therebetween an annular groove extending concentric with the axis of the plug, a ring of solder positioned in the closed end of said groove, said groove being adapted to receive said lateral flange of the tank into contacting position with the ring of solder, and said skirt portion of the plug being spun over to clamp the wall of the tank between the flange and skirt portions of the plug, whereby to confine the solder in the concentric groove formed by the skirt and flange of the plug.

In testimony whereof I affix my signature.

JAMES IRONSIDE.